United States Patent [19]

Ishisaka et al.

[11] Patent Number: 4,828,374
[45] Date of Patent: May 9, 1989

[54] ALBADA TYPE INVERTED GALILEO FINDER

[75] Inventors: Akira Ishisaka; Kohei Ota, both of Hachioji, Japan

[73] Assignee: Konica Corporation, Tokyo, Japan

[21] Appl. No.: 156,887

[22] Filed: Feb. 18, 1988

[30] Foreign Application Priority Data

Mar. 9, 1987 [JP] Japan .................. 62-52111

[51] Int. Cl.$^4$ .......................... G02B 9/12; G02B 9/34; G02B 19/00
[52] U.S. Cl. ..................... 350/432; 350/443
[58] Field of Search ................. 350/432, 474, 443

[56] References Cited

U.S. PATENT DOCUMENTS 4,441,802 4/1984 Iizuka .................. 354/224

FOREIGN PATENT DOCUMENTS 0149017 9/1983 Japan .................. 350/432
60-8935 1/1985 Japan .
61-91618 5/1986 Japan .

Primary Examiner—John K. Corbin
Assistant Examiner—Rebecca D. Gass
Attorney, Agent, or Firm—Finnegan, Henderson, Farabow, Garrett & Dunner

[57] ABSTRACT

An Albada type inverted Galileo finder which is suitable for use with a compace lens shutter camera, which is small in size, and which is visible without occurrence of any ghost not only in an object but a finder frame.

If lenses are disposed in order of negative, positive and positive from the side of an object and a reflecting surface of an Albada system is a surface on the side of the object of a positive lens, a finder which involves no ghost and is advantageous for correction of aberrations can be obtained. Furthermore, if the on-the-axis thickness of each lens is restricted to thereby provide a plastic lens, precision of molding can be improved.

4 Claims, 3 Drawing Sheets

ALBADA TYPE INVERTED GALILEO FINDER

BACKGROUND OF THE INVENTION

1. Field of the Invention

This invention relates to an Albada type inverted Galileo finder, and particularly to an Albada type inverted Galileo finder which is small in size and free from a ghost image.

2. Description of the Prior Art

In a lens shutter camera, an Albada type inverted Galileo finder has been exclusively used as a finder. With the recent trend of miniaturization of cameras, not only a master lens for photography but also a finder system have been demanded to be the small type. Furthermore, the fact that aberrations are not only fully corrected but there is no ghost image is the object for appraisal.

At present, the size in the vertical direction to the optical axis of most of inverted Galileo finders are designed to be determined by the effective diameter of an objective lens, and therefore it is important to reduce the effective diameter of the objective lens. The effective diameter can be reduced if the finder magnification is reduced, but in this case, an object appears to be small and is hard to see.

On the other hand, as an example, Japanese Patent Application Laid-Open No. 91,618/1986 discloses the art in which an ocular lens is thickened to shorten an optical path thereby reducing the effective diameter of an objective lens. However, if this is formed from a plastic lens, the wall-thickness of the ocular lens is too large. Therefore, in the injection molding, there are disadvantages as follows:

(a) Since there is a difference in cooling time between a peripheral portion and a center portion, there produces a contraction in a direction of an optical axis and a surface precision becomes deteriorated.

(b) To maintain the surface precision, control by precise (pressure - volume - time) is required; it takes much time for cooling; and cost increases.

Furthermore, as an example, Japanese Utility Model Application Laid-Open No. 8,935/1985 discloses the art in which an intermediate optical member is interposed between an ocular lens and an objective lens to shorten an optical path. In this case, however, since a surface of a concave lens on the side of the pupil is made to comprise a reflecting surface of the Albada system, if the curvature of the reflecting surface is small, a ghost occurs. If the curvature is made to be increased in consideration of the ghost, the image surface of the Albada system greatly tends i a direction of negative diopter; the negative refracting power of an ocular lens group becomes great; and the negative distortion aberration of the finder system becomes great. Furthermore, the distance between the principal points of the objective lens group and the ocular lens group becomes small, and the positive refracting power of the ocular lens group need be strengthened and the comatic aberration of the Albada system remarkably occurs. If the magnification is increased to increase the field angle, the aforesaid various aberrations become further deteriorated.

SUMMARY OF THE INVENTION

It is an object of the present invention to provide an Albada type inverted Galileo finder which is free from a ghost image and small in effective diameter.

Generally, in the Albada type inverted Galileo finder composed of concave-concave-convex as shown in FIG. 5, routes for occurrence of ghosts are considered as follows:

In the ghost of an object image:
(1) (incident light)→$r_4$ (reflection)→$r_3$ (reflection)→$r_6$
(2) (incident light)→$r_5$ (reflection)→$r_4$ (reflection)→$r_6$ In the ghost of the optical frame:
(3) $r_5$ (optical frame)→$r_3$ (reflection)→$r_6$ /

To remove the ghost images in the above (1) and (3), it is necessary that curvatures of both surfaces of the second lens are made to be different to some extent or more; and to remove the ghost image of the above (2), it is necessary that a curvature of the reflecting surface is increased. In order that the curvatures of both surfaces of the second lens are made to be different, it is better to make the refracting power of said lens positive instead of negative. Thereby the inverted Galileo finder can be easily constituted. However, even in this case, if the reflecting surface is on the side of the pupil, when the curvature is made to be large, the aforementioned various aberrations occur.

According to the present invention, an Albada type inverted Galileo finder comprises, in order from an object side, a group of objective lenses having a negative refracting power, and a group of ocular lenses having a positive refracting power, a surface of one lens having a positive refracting power on the side of the object being a reflecting surface of an Albada system, said finder being fulfilled with the conditions as follows:

$$di < 0.45L \qquad (a)$$

$$0.25L < \sum_{i=2}^{m} di < 0.9L \qquad (b)$$

where
L: overall length of a finder
di: On-the-axis thickness of the ith lens from the object side in the group of ocular lenses
m: number of lenses Further, the Albada type inverted Galileo finder of the present invention is preferably fulfilled with the condition:

$$\tfrac{1}{3}L < C_1' < 1/0.2L \ldots \qquad (c)$$

where
$C_l'$: curvature of a reflecting surface of Albada system

First, a method for reducing an effective diameter of an objective lens will be described. For simplification, it is assumed that a finder system is an afocal system. A finder system is composed of the k number of surfaces as shown in FIG. 6. If the refractive index on the side of object and on the side of pupil is 1, the following relation is established:

$$\bar{h}_1 = \gamma \bar{h}_k + \alpha_1 \delta \qquad (1)$$

$$\delta = \sum_{i=2}^{k} \left( e_{i-1}' / \left( \frac{h_{i-1}}{h_i} \cdot \frac{h_i}{h_1} \right) \right) \alpha_1 = 0$$

(according to "Method For Designing Lens" by Yoshiya Matsui (Kyoritsu Syupan)
where
$h_1$: paraxial incident height of on-the-axis ray to the ith surface
$\alpha_1$: paraxial angle of inclination of on-the-axis ray in an object space, and when a position of an object is infinite remote, $\alpha_1 = 0$
$\bar{h}_i$: paraxial incident height of principal ray at the ith surface
$\bar{\alpha}_1$: paraxial angle of inclination of principal ray at the object space
$e_i'$: Converted surface spacing from the ith surface to the next surface, that is, if the surface spacing from the ith surface to the next surface is $t_i'$ and the refractive index is $N_i'$, $e_1' = t_i'/N_i'$
$\gamma$: finder magnification The effective diameter of the objective lens is determined by $\bar{h}_1$, and in the formula (1), $\alpha_1$ and $\bar{h}_k$ are the amount determined by the angle of view of the photographic lens, the finder magnification and the position of the eye point. When these are constant, $\bar{h}_1$ increases together with $\delta$. It is found from the formula (1) that in order to make $\bar{h}_1$ small while the overall length of the finder is maintained constant, it is effective to increase the wall-thickness of the lens in the ocular lens group with large $h_i$, and shorten the space portion to make $\delta$ small.

The condition (a) is concerned with the on-the-axis thickness of the individual lenses in the ocular lens group. When the value in the condition exceeds the upper limit, molding is difficult to perform failing to maintain the precision.

The condition (b) is concerned to reduce the effective diameter of the objective lens. When the value in the condition exceeds the upper limit, the wall-thickness of the objective lens group becomes small, failing to form an inverted Galileo finder. Conversely, when the value in the condition exceeds the lower limit, the effective diameter of the objective lens becomes large, losing a compactness.

Next, the fact that the surface on the object side of a positive lens is made into the Albada system reflecting surface thereby to reduce the curvature of an image surface of the Albada system will be described.

As a general Albada type inverted Galileo finder, a system is here taken which comprises, in order from an object side, a concave lens, a second lens having a reflecting surface on the pupil side, and a cover lens, as shown in FIG. 7. It is assumed that these three lenses are all thin. Then, the following is given:

$$\phi_O = (n-1)(C_1 - C_2) \quad (2)$$

$$\phi_A = 2C_2$$

where
$\phi_O$: refracting power of the second lens
$\phi_A$: refracting power of the second lens as the lbada system
$C_1$: curvature of the surface of the second lens on the object side
$C_2$: curvature of the surface of the second lens on the pupil side
$n$: refractive index of the second lens On the other hand, if the surface of the second lens on the object side is made into the reflecting surface and the symbol (') is applied, then $$\phi_O' = (n-1)(C_1' - C_2') \quad (3)$$

$$\phi_A' = 2nC_1' + (1-n)C_2'$$

It is here assumed to be $\phi_O = \phi_O'$ and $\phi_A = \phi A'$, and for both the finder system and the Albada system, the power arrangement is constant. Then, variation of the Petzval's value is as follows:

From formulae (2) and (3), $$C_1' = (1-n)C_1 + nC_2 \quad (4)$$

$$C_2' = -nC_1 + (n+1)C_2$$

To make the astigmatism of the optical system small and make the image surface flat, it is necessary to make the Petzval's sum small. If the curvature of the reflecting surface is made large in consideration of the ghost image, the Petzval's sum of the albada system takes a large negative value because of the great contribution of the reflecting surface and therefore the image surface is inclined in a direction of a negative diopter.

The Petzval's value of the second lens alone as the Albada system when the reflecting surface is on the side of the pupil is given by $$P_A = -2C_2 \quad (5)$$

When the reflecting surface is on the side of the object, then, $$P_A' = -\frac{2}{n}C_1' + \frac{2(1-n)}{n}C_2' \quad (6)$$

From the formulae (4), (5) and (6), $$\frac{P_A'}{P_A} = \frac{1-n^2}{n} \cdot \frac{C_1}{C_2} + \frac{n^2+n-1}{n} \quad (7)$$

From the formula (7), $(P_A'/P_A)$ linearly decreases as $(C_1/C_2)$ increases, and in $(C_1/C_2) > 1$, $P_A'/P_A < 1$ is obtained. The Petzval's value becomes small in the case where the reflecting surface is on the side of the object. In the normal Albada system, $C_2 > 0$, and therefore, in case of $P_A'/P_A < 1$, $C_1 > C_2 > 0$, that is, in the structure where a lens including a reflecting surface has a positive refracting power, the reflecting surface of the Albada system can be made into the surface on the side of the object to thereby make the Petzval's sum small and make the curvature of the image surface small.

The condition (c) is concerned with the curvature of the reflecting surface. When the value in the condition exceeds the upper limit, the image surface of the Albada system is greatly inclined in a direction of a negative diopter. When the value in the condition exceeds the lower limit, the ghost image appears.

In addition, if an optical system has 1 aspherical surfaces, it is preferably fulfilled with the following conditions:

$$-2.0 \text{ mm} < \Delta X_1(0.3L) < -0.005 \text{ mm} \quad (d)$$

$$-1.5 \text{ mm} < \sum_{i=2}^{l} \Delta X_1(0.3L) < -0.005 \text{ mm} \quad (e)$$

Here, $\Delta X_i(0.3L)$ shows the degree of the ith aspherical surface from the object side, and represents a deviation from a reference spherical surface at the height of 0.3L (where L is the overall length of a finder) from the optical axis. If each aspherical surface is expressed by $$X(y) = \frac{C^* y^2}{1 + \sqrt{1 - (1 + k) C^{*2} y^2}} + \sum_j A_j y^j$$

then, $$X(y) = \frac{Cy^2}{1 + \sqrt{1 - C^2 y^2}}$$

$C = C^* + 2A_2$: paraxial curvature

The value of the deviation X relative to the spherical surface represented by the above equation in the height y=0.3L from the optical axis is expressed by $$\Delta X(0.3L) + \frac{C^* (0.3L)^2}{1 + \sqrt{1 - (1 + k)C^{*2}(0.3L)^2}} +$$

$$\sum_j A_j(0.3L)^j - \frac{C (0.3L)^2}{1 + \sqrt{1 - C^2(0.3L)^2}}$$

K: Coefficient of secondary curved surface
$A_j$: Coefficient of aspherical surface The condition (d) is concerned with the surface on the pupil side of the first lens. When the value in the condition exceeds the upper limit, a negative distortion of the finder system becomes large. Conversely, when the value in the condition exceeds the lower limit, a comatic aberration of the finder system becomes remarkable.

The condition (e) is concerned with the aspherical surface of the ocular lens group. When the value in the condition exceeds the upper limit, occurrence of comatic aberrations of the finder system and the Albada system is remarkable. When the value in the condition exceeds the lower limit, the image surface of the Albada system is greatly inclined in a direction of a negative diopter.

DETAILED DESCRIPTION OF THE PREFERRED EMBODIMENTS

Figure 1:
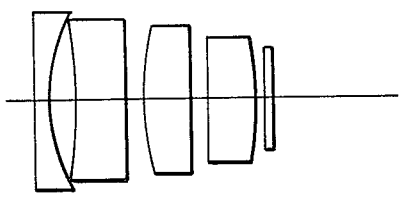
FIG. 1 is a sectional view of a first embodiment of an Albada type inverted Galileo finder according to this invention.
Figure 2:
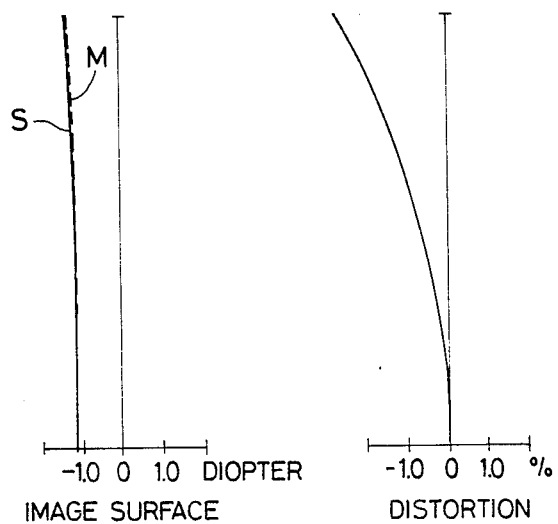
FIG. 2 is a curve of aberration thereof.
Figure 2:
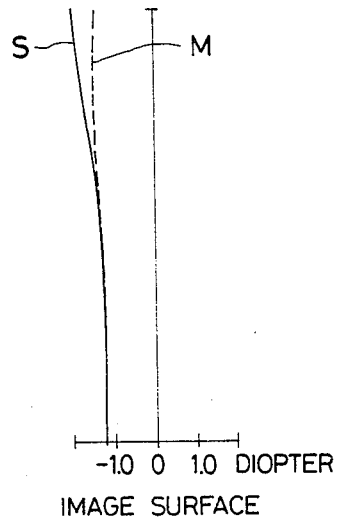
Figure 3:
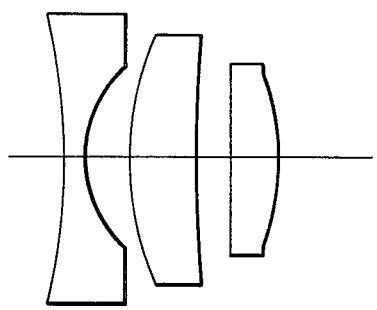
FIG. 3 is a sectional view of a second embodiment.
Figure 4:
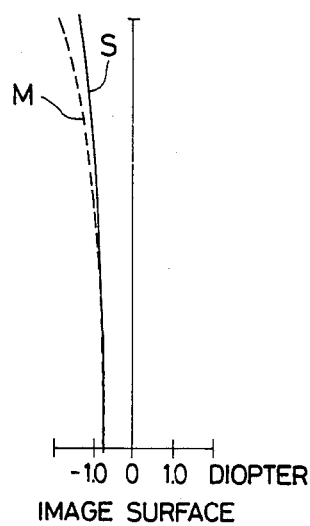
FIG. 4 is a curve of aberration thereof.
Figure 4:
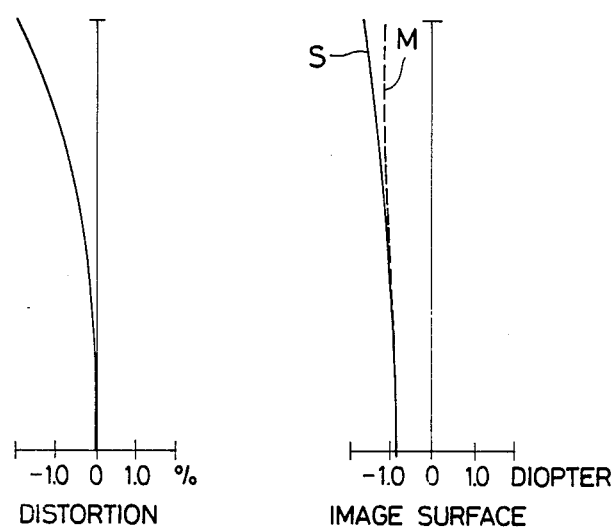
Figure 5:
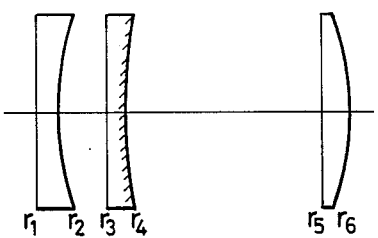
FIG. 5 is a sectional view of a conventional Albada type inverted Galileo finder.
Figure 6:
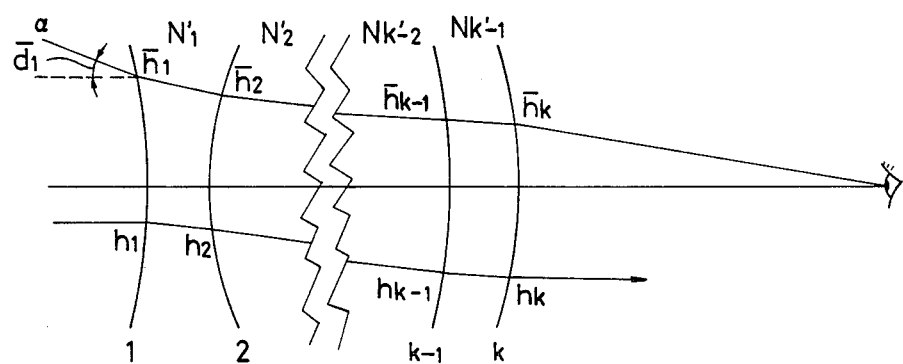
FIG. 6 shows an optical path of the inverted Galileo finder.
Figure 7:
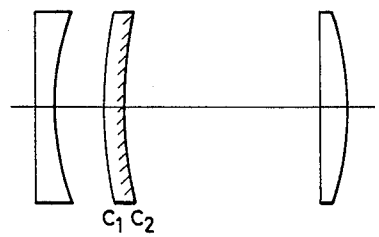
FIGS. 7 and 8 are respectively sectional views of an Albada type inverted Galileo finder of the 3-lens construction.
Figure 8:
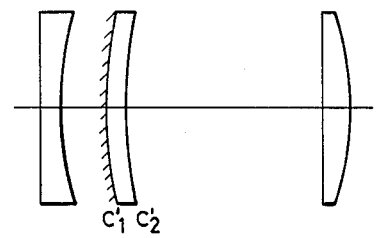

In the following, Embodiments of this invention will be given.

In the Tables, W is the angle of view; R, the radius of curvature of the refracting surfaces; d, the spacing between the refracting surfaces; N, the refractive index; and *, the aspherical surface.

| Embodiment 1 Magnification 0.65 W = 28° | | | |
|---|---|---|---|
| Surface No. | R | d | N |
| 1 | $0.1 \times 10^{20}$ | 1.5 | 1.492 |
| *2 | 17.7 | 3.5 | 1 |
| 3 | −80 | 6 | 1.492 |
| 4 | $0.1 \times 10^{20}$ | 2.3 | 1 |
| *5 | 38.7 | 6 | 1.492 |
| 6 | 600 | 2 | 1 |
| 7 | $0.1 \times 10^{20}$ | 6 | 1.492 |
| *8 | −42.745 | 1 | 1 |
| 9 | $0.1 \times 10^{20}$ | 1 | 1.51633 |
| 10 | $0.1 \times 10^{20}$ | | 1 |

*Second surface K = −0.4
*Fifth surface $A_4 = -1.5 \times 10^{-6}$
*Eighth surface $A_4$ $9.0 \times 10^{-6}$ The fifth surface is an Albada system reflecting surface and the ninth surface is an evaporated surface of a visual field frame.

$L = 29.3$      $\Delta X_1(0.3L) = -0.067$ $\left( \sum_{i=2}^{5} di \right)/L = 0.65$    $\sum_{i=2}^{3} \Delta Xi(0.3L) = -0.046$

| Embodiment 2 Magnification 0.55 W = 28° | | | |
|---|---|---|---|
| Surface No. | R | d | N |
| 1 | −80 | 2 | 1.492 |
| *2 | 11 | 6 | 1 |
| 3 | 36.6 | 8 | 1.492 |
| 4 | 200 | 4 | 1 |
| 5 | $0.1 \times 10^{20}$ | 6 | 1.492 |
| *6 | −24.65 | | 1 |

*Second surface K = −0.9
Sixth surface K = −5.0

The third surface is a reflecting surface, and the fifth surface is an evaporated surface of a visual field frame.

$L = 26$      $\Delta X_1(0.3L) = -0.443$ $\left( \sum_{i=2}^{3} di \right)/L = 0.54$    $\sum_{i=2}^{2} \Delta Xi(0.3L) = -0.137$ According to this invention, as can be understood from the above-described embodiments and drawings, the finder is small in size, and aberrations are well corrected for both the finder system and the Albada system, and ocurrence of a ghost image is restrained. Moreover, the thickness of lenses is not difficult to form, and an inexpensive finder can be obtained.

What is claimed is:
1. An Albada type inverted Galileo finder comprising:
a plurality of lenses, one of said plurality of lenses having a positive refractory power whose surface on the object side is a reflecting surface of an Albada system, said finder conforming to the following conditions:

$$di < 0.45L$$

-continued
$$0.25L < \sum_{i=2}^{m} di < 0.9L$$

where L=the on-the-axis length of the finder from the surface closest to the object of the finder system to the surface closest to the pupil;
di=the on-the-axis thickness of the ith lens from the object side; and
m=the number of lenses in the finder.

2. An Albada type inverted Galileo finder according wherein said finder is fulfilled with $\frac{3}{8}L < C_1' < 1/0.2L$ where $C_1'$ is the curvature of an Albada system reflecting surface.

3. An Albada type inverted Galileo finder according to claim 1, wherein said finder is fulfilled with $-2.0 \text{ mm} < \Delta X_1(0.3L) < -0.005 \text{ mm}$ if the surface of on the pupil side of the object lens is an aspherical surface, a value in a height from an optical axis y=0.3L of a difference $\Delta X$ between (said) aspherical surface and a reference spherical surface is represented by $$\Delta X(0.3L) = \frac{C^*(0.3L)^2}{1 + \sqrt{1 - (1 + k) C^{*2}(0.3L)^2}} +$$

$$\sum_j A_j(0.3L)j - \frac{C(0.3L)^2}{1 + \sqrt{1 - C^2(0.3L)^2}}$$

K: the coefficient of the secondary curved surface
Aj: the coefficient of the aspherical surface
$C = C^* + 2A_2$ (paraxial curvature).

4. An Albada type inverted Galileo finder according to claim 1, which has aspherical surfaces, the total value in a height from an optical axis y=0.3L of a difference X between said aspherical surface and the spherical surface is fulfilled with $$-1.5 \text{ mm} < \sum_{i=2}^{l} \Delta Xi(0.3L) < -0.005 \text{ mm}$$

where $\Delta Xi(0.3L)$: a value of deviation from a reference spherical surface of ith aspherical surface from the object side at the height of 0.3L from the optical axis.

* * * * *

UNITED STATES PATENT AND TRADEMARK OFFICE
CERTIFICATE OF CORRECTION

PATENT NO. : 4,828,374
DATED : May 9, 1989
INVENTOR(S) : Akita Ishisaka

It is certified that error appears in the above-identified patent and that said Letters Patent is hereby corrected as shown below:

On the title page:

Abstract, line 2, change "foruse" to --for use--.

Claim 1, column 6, line 62, change "refractory" to --refracting--.

Claim 2, column 7, line 11, "according" should be followed by --to Claim 1--.

Claim 2, column 7, line 14, change "2/3L" to --1/3L--.

Claim 2, column 7, lines 14-15 "where $C_1'$ is ... surface" should be printed in regular type.

Claim 2, column 7, lines 14-15 "where $C_1'$ is ... surface" should begin next line without an indentation.

Signed and Sealed this

Third Day of July, 1990

*Attest:*

HARRY F. MANBECK, JR.

*Attesting Officer*  *Commissioner of Patents and Trademarks*